United States Patent
Williams et al.

[11] Patent Number: 5,269,467
[45] Date of Patent: Dec. 14, 1993

[54] VECTORING EXHAUST NOZZLE SEAL AND FLAP RETAINING APPARATUS

[75] Inventors: Keith A. Williams; William C. Lippmeier, both of Cincinnati, Ohio

[73] Assignee: General Electric Company, Cincinnati, Ohio

[21] Appl. No.: 923,667

[22] Filed: Aug. 3, 1992

[51] Int. Cl.⁵ .............................. B64C 9/38
[52] U.S. Cl. .................... 239/265.41; 239/265.19; 239/265.33; 60/230
[58] Field of Search ............ 239/265.19, 265.33, 239/265.35, 265.39, 265.41; 60/230

[56] References Cited

U.S. PATENT DOCUMENTS

| | | | |
|---|---|---|---|
| 3,972,475 | 8/1976 | Nelson et al. | 239/265.41 |
| 4,128,208 | 12/1978 | Ryan et al. | 239/265.39 |
| 4,171,093 | 10/1979 | Honeycutt, Jr. et al. | 239/265.39 |
| 4,994,660 | 2/1991 | Hauer | 239/265.41 |
| 5,076,496 | 12/1991 | Lippmeier | 239/265.41 |

*Primary Examiner*—Andres Kashnikow
*Assistant Examiner*—Christoper G. Trainer
*Attorney, Agent, or Firm*—Jerome C. Squillaro; David L. Narciso

[57] ABSTRACT

A flap to seal retaining apparatus for providing retention between adjacent longitudinally extending seals and flaps in an aircraft gas turbine engine axisymmetric vectoring nozzle. The retaining apparatus provides a channel having transversely extending channel walls mounted on the flap. A retaining lug supported from the seal is disposed within the channel and a positioning device is provided to maintain the retaining lug within the channel when the adjacent seal and flap are skewed with respect to each other. The positioning device provides the lug with a two degree freedom (2DOF) of motion with respect to the flap within the channel.

12 Claims, 2 Drawing Sheets

VECTORING EXHAUST NOZZLE SEAL AND FLAP RETAINING APPARATUS

BACKGROUND OF THE INVENTION

1. Field of the Invention

The present invention relates generally to gas turbine engine axisymmetric vectorable nozzles and, more particularly, to a flap to seal retainer.

2. Discussion of the Background Art

One type of conventional gas turbine engine exhaust nozzle includes primary and secondary exhaust flaps arranged for defining a variable area converging-diverging exhaust nozzle. The exhaust nozzle is axisymmetric, or annular, and exhaust flow is confined by the primary and secondary flaps being positioned circumferentially adjacent to each other, respectively.

The secondary flaps, for example, have a forward end defining a throat of minimum flow area and an aft end having a larger flow area for defining a diverging nozzle extending downstream from the throat. The secondary flaps are variable, which means that the spacing between the secondary flaps as they are moved from a smaller radius position to a larger radius position must necessarily increase. Accordingly, conventional exhaust nozzle flap seals are suitably secured between adjacent ones of the secondary flaps to confine the exhaust flow and prevent leakage of exhaust flow between the secondary flaps.

An advanced axisymmetric vectoring nozzle (AVEN TM nozzle) has been developed and patented in U.S. Pat. No. 4,994,660, entitled "AXISYMMETRICAL VECTORING EXHAUST NOZZLE", by Hauer, assigned to the present assignee, and herein incorporated by reference. An axisymmetric vectoring nozzle provides a means for vectoring the thrust of an axisymmetric convergent/divergent nozzle by universally pivoting the divergent or secondary flaps of the nozzle in an asymmetric fashion or in other words pivoting the secondary flaps in radial and tangential directions with respect to the unvectored nozzle centerline.

Vectoring nozzles, and in particular axisymmetric vectoring nozzles of the type disclosed in the Hauer reference, provide positionable secondary flaps. These secondary flaps are positionable not only symmetrically, relative to a longitudinal centerline of the exhaust nozzle, but may also are positionable asymmetrically relative thereto for obtaining pitch and yaw vectoring. In such a vectored position, adjacent secondary flaps are positioned askew from each other, and therefore the exhaust nozzle flap seal disposed therebetween must be effective for maintaining sealing also as the secondary flaps are positioned for vectoring.

Furthermore, since the exhaust nozzle is channeling relatively hot combustor discharge gases, the exhaust nozzle flap seals must be able to accommodate such relatively hot temperatures and differential movement of structural elements due to differential heating and cooling thereof.

Retaining the flaps and adjacent seals in place for an axisymmetric nozzle is very difficult because of the varying degree of askewness between the flaps and seals encountered during asymmetric operation of the nozzle for thrust vectoring. The seal has to be retained radially, with respect to the nozzle's centerline, and circumferentially to prevent the flap seals from becoming unfeathered from the adjacent flaps. Radial retention between the seal and flap is required to counteract the inverse exhaust pressures that occur when there is higher pressure on the radially outer surfaces of the seal and flap than on the radially inner surfaces. Circumferential retention is required to prevent unfeathering between the divergent flap and seal which may occur during vectoring operation of the exhaust nozzle or in the case of an nozzle actuator hydraulic system (or other actuating system) failure.

SUMMARY OF THE INVENTION

The present invention provides a flap to seal retaining apparatus for providing retention between adjacent longitudinally extending seals and flaps in an aircraft gas turbine engine axisymmetric vectoring nozzle. The retaining apparatus provides a channel having transversely extending channel walls mounted on the flap. A retaining lug supported from the seal is disposed within the channel and a positioning means is provided to maintain the retaining lug within the channel when the adjacent seal and flap are skewed with respect to each other. The positioning means provides the lug with a two degree freedom (2DOF) of motion with respect to the flap within the channel.

One embodiment provides a retaining apparatus useful on a forward portion of an AVEN TM flap and seal assembly and has the lug supporting element pivotably mounted on the post and the lugs have a spherical shape and are narrowly confined by the channel walls thereby providing a 2DOF of motion, in the transverse direction and a rotational direction with respect to the flap.

Another embodiment provides a retaining apparatus useful on an aft portion of an AVEN TM flap and seal assembly and has the lug supporting element fixedly mounted on the post and the lugs broadly confined by the channel walls. This provides a 2DOF of motion positioning means wherein the aft retaining lugs are attached to cantilevered ends of supporting arms that extend outward in opposite directions from a central point of a lug support element. The lug support element is supported by a post extending from the back of the seal and the lugs are disposed in adjacent ones of the channels on the adjacent flaps.

A more particular embodiment of the invention provides the are retaining lugs that are hook shaped and effective to engage corresponding divergent flap edge hooks disposed in the lateral ends of the aft channels wherein all hooks are angled circumferentially inward towards their respective seal and flap centers. This provides a circumferential retention means, to prevent unfeathering between the seal and flap

BRIEF DESCRIPTION OF THE DRAWING

The novel features believed characteristic of the present invention are set forth and differentiated in the claims. The invention, together with further objects and advantages thereof, is more particularly described in conjunction with the accompanying drawing in which:

DETAILED DESCRIPTION

Figure 1:
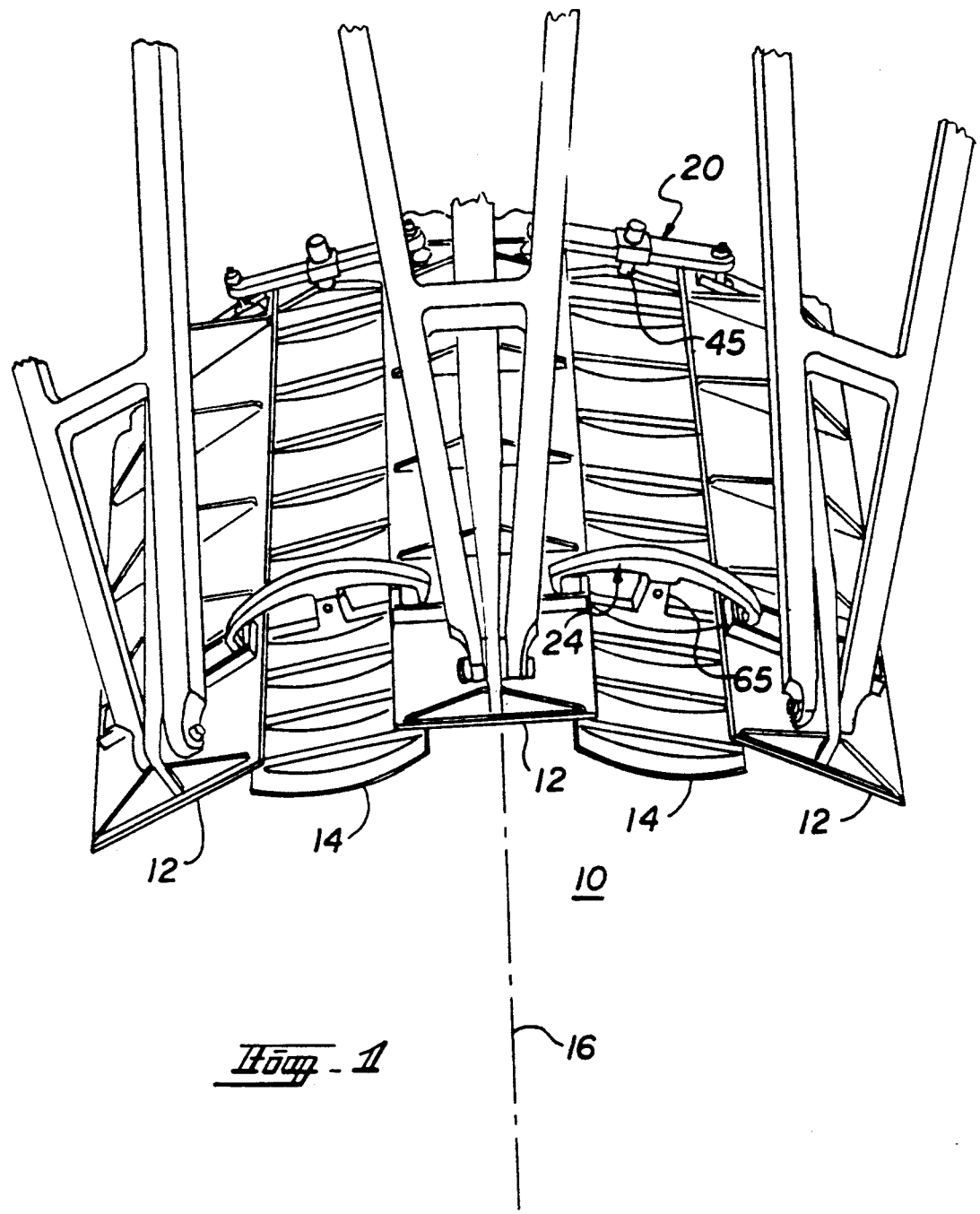
FIG. 1 is a radially inward planform view of several adjacent flaps and seals in the divergent section of an axisymmetric vectoring exhaust nozzle for a gas turbine engine having retaining apparatus in accordance with the present invention.

Illustrated in FIG. 1 is an exemplary embodiment of a portion of a divergent flap and seal assembly 10 for an axisymmetric, vectorable, variable area exhaust nozzle for an aircraft gas turbine engine such as the type referenced above. The divergent flap and seal assembly 10 has a plurality of adjacent flaps 12 and seals 14 disposed in overlapping sealing relationship about an unvectored nozzle centerline 16. The seals 14 are disposed radially inward of the adjacent flaps 12 and designed to seal against the flaps during nozzle operation when the nozzle pressure, the pressure radially inward of the flaps 12 and seals 14, is normally greater than the pressure outside the nozzle.

The AVEN TM nozzle vectors thrust by positioning the divergent flaps 12 and seals 14 axisymmetrically relative to the centerline 16 therefore the radial and circumferential positions and attitude. The view in FIG. 1 is from the aft looking forward and shows a forward retaining means 20 at a forward position 45 of the seal 14 and an aft retaining means 24 at an aft position 65 of the seal 14.

Figure 2:
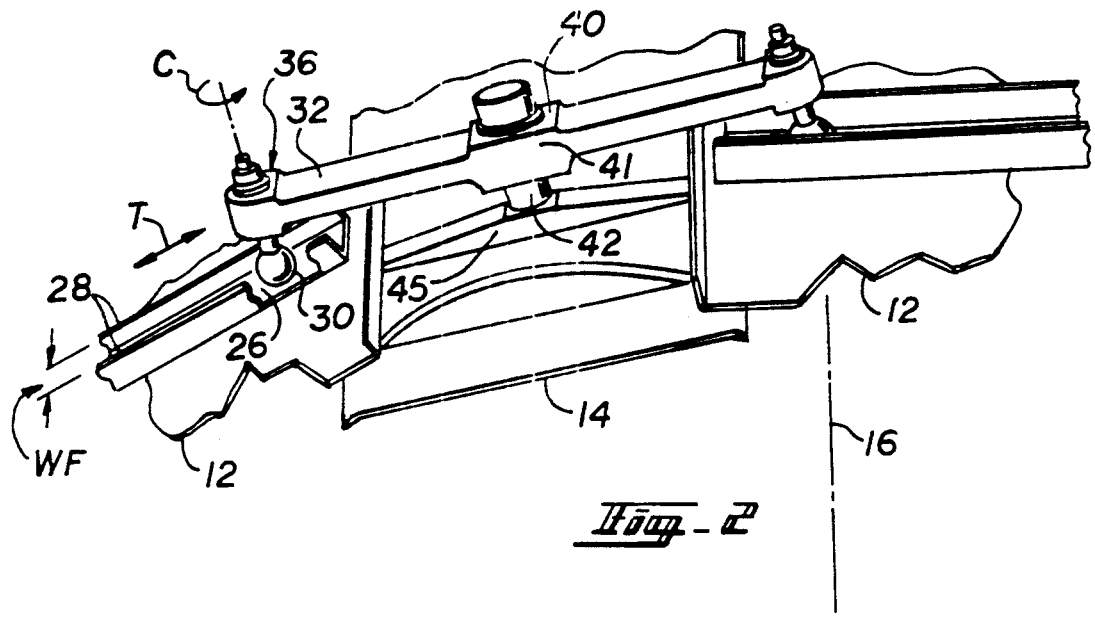
FIG. 2 is a perspective view of the forward retaining apparatus in FIG. 1.

FIG. 2 illustrates, in more detail, the forward retaining means 20 having a transversely extending forward channel 26 including forward channel walls 28 mounted on the back of the flap 12. A spherically shaped forward retaining lug 30 is supported from the seal 14 at the end of a forward arm 32 and is movably disposed within the forward channel 26. A forward positioning means 36 is provided to help position adjacent flaps 12 and seals 14 by positioning the forward retaining lug 30 within the forward channel 26 when the adjacent seal 14 and flap 12 are moved and in particular when their attitudes with respect to each other is change during thrust vectoring.

The forward positioning means 36 provides a pivotal means for forward arm 32 and a narrow width WF of the forward channel 26 that restricts the movement of the forward retaining lug 30 and provides it with a two degree freedom (2DOF) of motion; in the transverse direction indicated by arrow T and in a rotational direction C, within the forward channel 26. The design is simplified by providing a pivotal element 40 having two forward arms 32 to provide positioning means 36 for two adjacent flaps. The pivotal element 40 is pivotably mounted at its center 41 to a forward post 42 preferably cast with and radially extending outwards from the forward position 45 of the back of seal 14.

The forward post 42 is preferably threaded at its top and a machined flange bushing is used to pivotably support pivotal element 40 secured by a nut on the threaded top of the forward post 42. The spherical shaped forward retaining lug 30 looks and operates somewhat like a trailer hitch ball. The lugs are necessary to maintain contact in the divergent flap forward channels when the exhaust nozzle is vectored.

Figure 3:
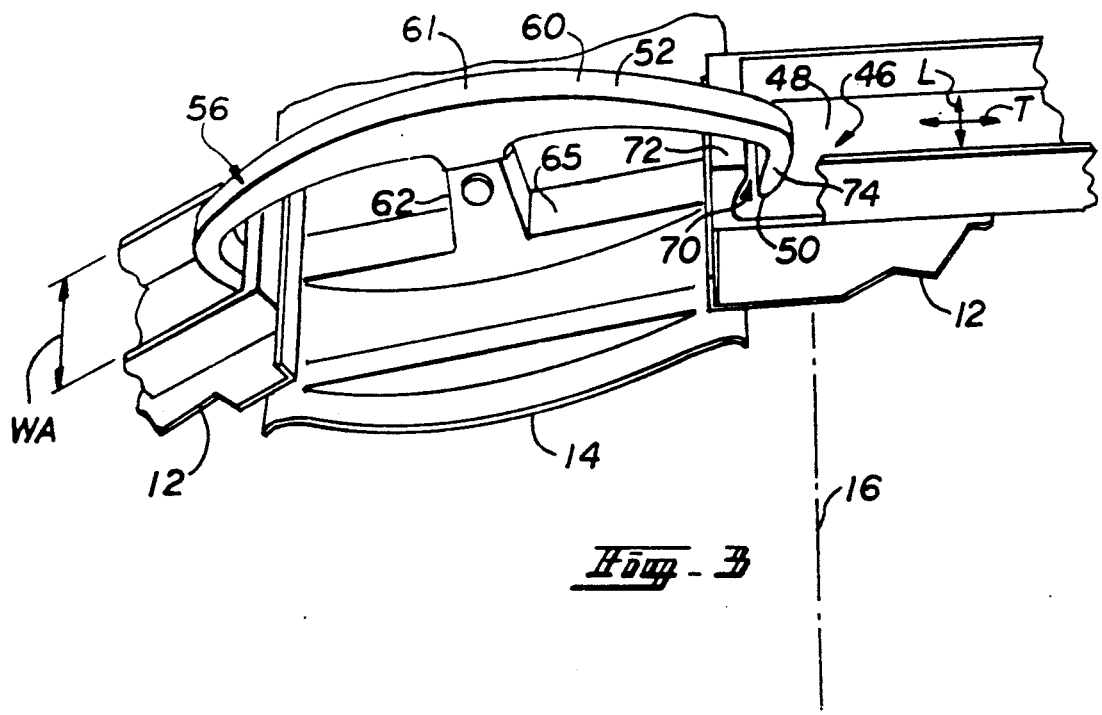
FIG. 3 is a perspective view of the aft retaining apparatus in FIG. 1.

FIG. 3 illustrates, in more detail, the aft retaining means 24 having a transversely extending aft channel 46 including aft channel walls 48 that is mounted on the back of the flap 12. A cylindrically shaped aft retaining lug 50 is supported from the seal 14 at the end of an aft arm 52 and is movably disposed within the aft channel 46. An aft positioning means 56 is provided to help position adjacent flaps 12 and seals 14 by positioning the aft retaining lug 50 within the aft channel 46 when the adjacent seal 14 and flap 12 are moved and in particular when their attitudes with respect to each other is change during thrust vectoring.

The aft positioning means 56 provides a relatively wide width WA of aft channel 46 that permits 2DOF movement of the aft retaining lug 50 with respect to the flap 12 in the transverse and longitudinal directions indicated by arrows labeled T and L within the aft channel 46. The design is simplified by providing a fixed bar 60 having two aft arms 52 to provide support for two aft retaining lugs 50. The fixed bar 60 is fixedly mounted at its center 61 to an aft post 62 preferably cast with and radially extending outwards from the aft position 65 of the back of seal 14.

Hook means 70 at the lug supporting ends of aft arms 52 and the end of aft channel 46 provides a circumferential retention means, to prevent unfeathering between the seal 14 and the flap 12. The aft channel 46 is capped with a first hook 72 in the form of a circumferentially angled wall and the aft retaining lug 50 is circumferentially opposite direction to form a second hook 74 that is engageable with a the first hook 72.

While the preferred embodiment of our invention has been described fully in order to explain its principles, it is understood that various modifications or alterations may be made to the preferred embodiment without departing from the scope of the invention as set forth in the appended claims.

We claim:

1. A retaining apparatus for providing retention between adjacent longitudinally extending seals and flaps in an aircraft gas turbine engine exhaust nozzle, said seal retaining apparatus comprising:
   a channel having transversely extending channel walls mounted on the flap,
   a retaining lug supported from the seal and movably disposed within said channel, and
   a positioning means to provide said retaining lug with a two degree freedom of motion relative to the flap within said channel.

2. A retaining apparatus as claimed in claim 1 wherein said positioning means comprises:
   an arm having a lug end and a pivotable end,
   said lug end supporting said retaining lug within said channel, and
   said pivotable end pivotably supported on a post on the seal.

3. A retaining apparatus as claimed in claim 2 further comprising:
   a second arm extending from said pivotable end and having a second lug end, and
   said second lug end supporting a second retaining lug within a second channel on the other flap adjacent to the seal.

4. A retaining apparatus as claimed in claim 3 wherein said retaining lug has a spherical shape.

5. A retaining apparatus as claimed in claim 4 further comprising said retaining lug disposed within said channel in sliding engagement with said channel walls.

6. A retaining apparatus as claimed in claim 1 wherein said positioning means comprises:
   an arm fixedly supported on a post mounted on back of the seal,
   said retaining lug supported within said channel by said arm, and
   said channel walls sufficiently spaced apart to provide longitudinal and transverse movement of said retaining lug within said channel to accommodate relative movement between the adjacent flaps and seals during vectoring of the nozzle.

7. A retaining apparatus as claimed in claim 6 wherein said positioning means further comprises a circumferential retention means to prevent unfeathering between the adjacent seals and the flaps.

8. A retaining apparatus as claimed in claim 7 wherein said circumferential retention means comprises a hooking means between said retaining lug supporting end of said arms and channel end walls longitudinally disposed between said channel walls.

9. A retaining apparatus as claimed in claim 8 wherein said hooking means comprises:
  said retaining lug angled to form a lug hook,
  said channel end wall angled to form a channel hook, and
  said retaining lug and channel end wall angled such that said lug hook and channel hook are operable to hook together.

10. A retaining apparatus for providing retention between adjacent longitudinally extending seals and flaps in an aircraft gas turbine engine exhaust nozzle, said seal retaining apparatus comprising:
  forward and aft channels having transversely extending forward and aft channel walls mounted on forward and aft positions of the flap,
  forward and aft retaining lugs supported from the seal and movably disposed within respective ones of said forward and aft channels, and
  forward and aft positioning means to provide said forward and aft retaining lugs with a two degree freedom of motion relative to the flap within said forward and aft channels.

11. A retaining apparatus as claimed in claim 10 wherein:
  said forward positioning means comprises a pivotable arm pivotably supported on a forward post at a forward position on the back of the seal,
  said pivotable arm supporting said forward retaining lug within said forward channel,
  said forward retaining lug disposed within said forward channel in sliding engagement with said forward channel walls,
  said aft retaining lug supported within said aft channel by a fixed arm fixedly supported on an aft post mounted at an aft position on the back of the seal, and
  said aft channel walls sufficiently spaced apart to provide longitudinal and transverse movement of said aft retaining lug within said aft channel to accommodate relative movement between the adjacent flaps and seals during vectoring of the nozzle.

12. A retaining apparatus as claimed in claim 11 wherein:
  said aft positioning means further comprises a circumferential retention means to prevent unfeathering between the adjacent seals and the flaps,
  said circumferential retention means comprises a hooking means between said aft retaining lug supporting end of said fixed arm and aft channel end walls longitudinally disposed between said transversely disposed aft channel walls,
  said aft retaining lug angled to form a lug hook,
  said aft channel end wall angled to form a channel hook, and
  said aft retaining lug and aft channel end wall angled such that said lug hook and channel hook are operable to hook together.

* * * * *